US011054402B2

(12) United States Patent
Fournel et al.

(10) Patent No.: US 11,054,402 B2
(45) Date of Patent: Jul. 6, 2021

(54) METHOD AND DEVICE FOR CHECKING A BOND BETWEEN TWO SUBSTRATES

(71) Applicant: Commissariat à l'Energie Atomique et aux Energies Alternatives, Paris (FR)

(72) Inventors: Frank Fournel, Villard-Bonnot (FR); Ali Dekious, Castelnau-les-Lez (FR); Emilie Deloffre, Saint-Ismier (FR); Gilles Despaux, Saint-Georges-d'Orques (FR); Vincent Larrey, La Murette (FR); Emmanuel Le Clezio, Les Matelles (FR)

(73) Assignee: Commissariat à l'Energie Atomique et aux Energies Alternatives, Paris (FR)

( * ) Notice: Subject to any disclaimer, the term of this patent is extended or adjusted under 35 U.S.C. 154(b) by 168 days.

(21) Appl. No.: 16/466,393

(22) PCT Filed: Dec. 6, 2017

(86) PCT No.: PCT/FR2017/053420
§ 371 (c)(1),
(2) Date: Jun. 4, 2019

(87) PCT Pub. No.: WO2018/104666
PCT Pub. Date: Dec. 9, 2016

(65) Prior Publication Data
US 2019/0353623 A1    Nov. 21, 2019

(30) Foreign Application Priority Data
Dec. 9, 2016    (FR) ...................................... 1662258

(51) Int. Cl.
*G01N 29/46* (2006.01)
*G01N 29/04* (2006.01)
*G01N 29/11* (2006.01)

(52) U.S. Cl.
CPC ........... *G01N 29/46* (2013.01); *G01N 29/043* (2013.01); *G01N 29/11* (2013.01);
(Continued)

(58) Field of Classification Search
CPC ...... G01N 29/46; G01N 29/043; G01N 29/11; G01N 29/4472; G01N 2291/015;
(Continued)

(56) References Cited

U.S. PATENT DOCUMENTS

| 5,408,881 A * | 4/1995 | Piche ..................... G01N 29/07 73/582 |
| 2011/0218743 A1* | 9/2011 | Smith ................ G01N 29/4418 702/56 |

OTHER PUBLICATIONS

Translation of the Written Opinion of the ISA for International Application No. PCT/FR2017/053420 dated Apr. 24, 2018, 6 pages.
A. Baltazar et al., "Inverse ultrasonic determination of imperfect interfaces and bulk properties of a layer between two solids," J. Acoust. Soc. Am. 114 (3), Sep. 2003, 12 pages.
J. Ding et al., "Reflection and transmission coefficients of the SH0mode in the adhesive structures with imperfect interface," Ultrasonics 70, 2016, pp. 248-257.
(Continued)

*Primary Examiner* — Suman K Nath
(74) *Attorney, Agent, or Firm* — Moreno IP Law LLC

(57) ABSTRACT

The invention relates to a method for checking an assembly comprising first (W1) and second (W2) joined substrates, comprising the following steps: a) transmitting an ultrasonic excitation signal towards the assembly by means of an ultrasonic transducer (301) located on the front face (A1) side of the first substrate (W1); b) measuring, using the transducer (301), an ultrasonic feedback signal including at least one echo (EF) of the excitation signal on the rear face (B2) of the second substrate (W2); c) calculating, using a processing circuit (303), a spectral signal representative of the change in frequency of an overall reflection coefficient of the assembly, defined as the ratio between the feedback
(Continued)

signal measured in step b) and the excitation signal; and d) deriving, from said spectral signal, information relating to the quality of the bond between the first (W1) and second (W2) substrates.

12 Claims, 4 Drawing Sheets

(52) U.S. Cl.
CPC .............. *G01N 2291/015* (2013.01); *G01N 2291/02827* (2013.01); *G01N 2291/0427* (2013.01); *G01N 2291/101* (2013.01); *G01N 2291/267* (2013.01)

(58) Field of Classification Search
CPC . G01N 2291/02827; G01N 2291/0427; G01N 2291/101; G01N 2291/267; G01N 2291/2697; G01N 2291/2694
See application file for complete search history.

(56) References Cited

OTHER PUBLICATIONS

L. Singher et al., "Considerations in Bond Strength Evaluation by Ultrasonic Guided Waves," J. Acoust. Soc. Am. 96 (4), Oct. 1994, 10 pages.
International Search Report for International Application No. PCT/Fr2017/053420, dated Apr. 24, 2018, 2 pages.
A. Baltazar et al., "On the relationship between ultrasonic and micro-structural properties of imperfect interfaces of layered solids," Rev. of Progress in Quantitative Nondestructive Evaluation, vol. 18, 1999, pp. 1463-1470.
A. Baltazar et al., "On the relationship between ultrasonic and micromechanical properties of contacting rough surfaces," J. Mechanics and Physics of Solids, vol. 50, 2002 pp. 1397-1416.
A. Lavrentyev et al., "Ultrasonic spectroscopy of imperfect contact interfaces between a layer and two solids," J. Acoust. Soc. Am. 103 (2), Feb. 1998, pp. 657-664.
M. Ouaftouh et al., "Evaluation De L'Adherence Par Ultrasons Haute-Frequence," Journal de Physique IV, Apr. 1992, 5 pages.

* cited by examiner

METHOD AND DEVICE FOR CHECKING A BOND BETWEEN TWO SUBSTRATES

FIELD

The present disclosure concerns a method and a device for controlling the quality of a bonding between two substrates.

BACKGROUND

There exist many applications, particularly in the fields of microelectronics and of optoelectronics, where two substrates are placed against each other via respective main surfaces, to obtain an assembly comprising a stack of the two substrates. The substrates may be of same nature, that is, made of identical materials, or of different natures, that is, made of different materials.

To control the quality of the bonding between the two substrates, methods comprising applying to the assembly sufficiently strong mechanical stress to cause a separation of the two substrates have been provided. By measuring the power necessary to achieve the separation, the bonding power between the two substrates can then be estimated. A major disadvantage of methods of this type is that they are destructive for the controlled assembly. In particular, in the context of an industrial production, such methods cannot be used to control all the formed assemblies, but only to perform a statistical control on a limited number of samples.

The article entitled "Ultrasonic spectroscopy of imperfect contact interfaces between a layer and two solids", of Anton I. Lavrentyev et al., the article entitled "On the relationship between ultrasonic and micro-structural properties of imperfect interfaces in layered solids", of A. Baltazar et al., and the article entitled "On the relationship between ultrasonic and micromechanical properties of contacting rough surfaces", of A. Baltazar et al., describe methods for characterizing, in an assembly comprising two surfaces in contact, properties of the interface between the two surfaces, by analysis of the response of the assembly to an ultrasound excitation signal. More particular, such methods are based on the spectral analysis of an echo of the ultrasound excitation signal, reflected on the interface to be characterized.

The article entitled "Évaluation de l'adhérence par ultrasons haute-fréquence", of M. Ouaftouh et al., described a similar method applied to the evaluation of the bonding between two substrates bonded to each other.

The methods described in the above-mentioned articles have the advantage of being non-destructive. However, a limitation of such methods is that they require being able of measuring an echo of the excitation signal, reflected on the interface to be evaluated. Now, in certain types of assemblies, particularly when the two substrates are made of identical materials and the surface roughnesses at the interface between the two substrates have very small dimensions, for example, smaller than 1 nm rms, the echo may be difficult, or even impossible to measure.

There is a need for a method and a device of control of the quality of a bonding between two substrates, which method and device overcome all or part of the disadvantages of known methods and devices.

SUMMARY

Thus, an embodiment provides a method of controlling an assembly comprising first and second substrates, each having a front surface and a rear surface, the rear surface of the first substrate being bonded to the front surface of the second substrate, the method comprising the steps of:

a) transmitting an excitation ultrasound signal towards the assembly by means of an ultrasound transducer placed on the front surface side of the first substrate;

b) measuring, by means of said transducer, a return ultrasound signal comprising at least one echo of the excitation signal on the rear surface of the second substrate;

c) calculating, by means of a processing circuit, a spectral signal representative of the frequency variation of a general reflection coefficient of the assembly, defined as being the ratio of the return signal measured at step b) to the excitation signal; and d) deducing from said spectral signal, by means of the processing circuit, information relative to the quality of the bonding between the first and second substrates.

According to an embodiment, step d) comprises the steps of:

detecting a series of successive peaks of the spectral signal, corresponding to resonances of the assembly comprising the first and second substrates; and determining the average frequency interval $\Delta f$ between two consecutive peals of respectively odd and even ranks or of respectively even and odd ranks in the series.

According to an embodiment, step d) comprises determining, from the determined average frequency interval $\Delta f$, a value representative of the bonding energy between the first and second substrates.

According to an embodiment, the series of peaks comprises at least 4 peaks;

According to an embodiment, the return signal comprises at least two successive echoes of the excitation signal on the rear surface of the second substrate.

According to an embodiment, the return signal comprises three successive echoes of the excitation signal on the rear surface of the second substrate.

According to an embodiment, at step b), the return signal is measured during two consecutive time ranges T1 and T2, range T1 only comprising a surface echo of the excitation signal directly reflected by the front surface of the first substrate, and range T2 comprising said at least one echo of the excitation signal on the rear surface of the second substrate; and at step c), the calculated spectral signal corresponds to the ratio of a frequency transpose of the return signal measured during range T1+T2 to a frequency transpose of the return signal measured during range T1.

According to an embodiment, the excitation ultrasound signal has a frequency in the range from 100 MHz to 1 GHz.

According to an embodiment, the duration of the excitation ultrasound signal is shorter than 1 µs.

According to an embodiment, steps a) to d) are repeated a plurality of times by displacing the ultrasound transducer parallel to the mean plane of the assembly between two successive iterations, to obtain an image or mapping of the quality of the bonding between the two substrates.

According to an embodiment, at step a), the excitation ultrasound signal is transmitted under a normal incidence with respect to the front surface of the first substrate.

Another embodiment provides a device for controlling an assembly comprising first and second substrates each having a front surface and a rear surface, the rear surface of the first substrate being bonded to the front surface of the second substrate, the device comprising an ultrasound transducer and a processing device configured to implement a control method such as defined hereabove.

BRIEF DESCRIPTION OF THE DRAWINGS

The foregoing and other features and advantages will be discussed in detail in the following non-limiting description of specific embodiments in connection with the accompanying drawings, among which.

DETAILED DESCRIPTION OF THE PRESENT EMBODIMENTS

Figure 1:
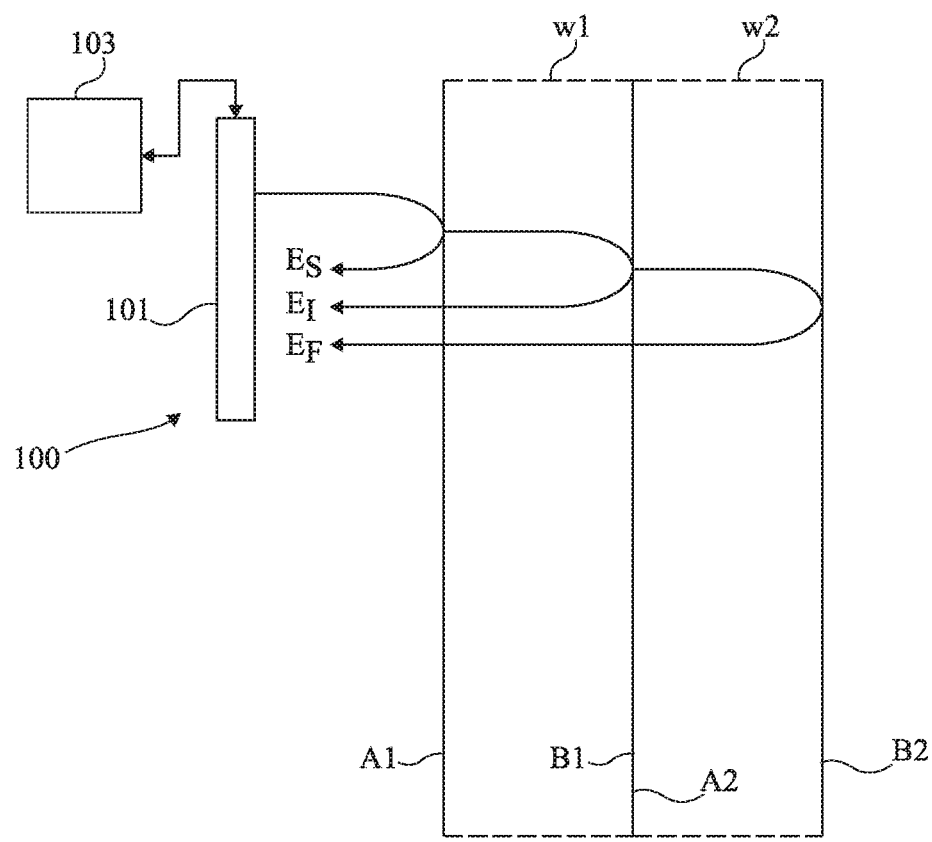
FIG. 1 is a simplified representation of an example of a device for controlling the quality of a bonding between two substrates.

The same elements have been designated with the same reference numerals in the various drawings and, further, the various drawings are not to scale. For clarity, only those steps and elements which are useful to the understanding of the described embodiments have been shown and are detailed. In particular, the ultrasound transducers of the described control devices have not been detailed, the described embodiments being compatible with ultrasound transducers currently used in systems of non-destructive ultrasound control. The terms "approximately", "substantially", and "in the order of" are used herein to designate a tolerance of plus or minus 10%, preferably of plus or minus 5%, of the value in question.

Figure 2:
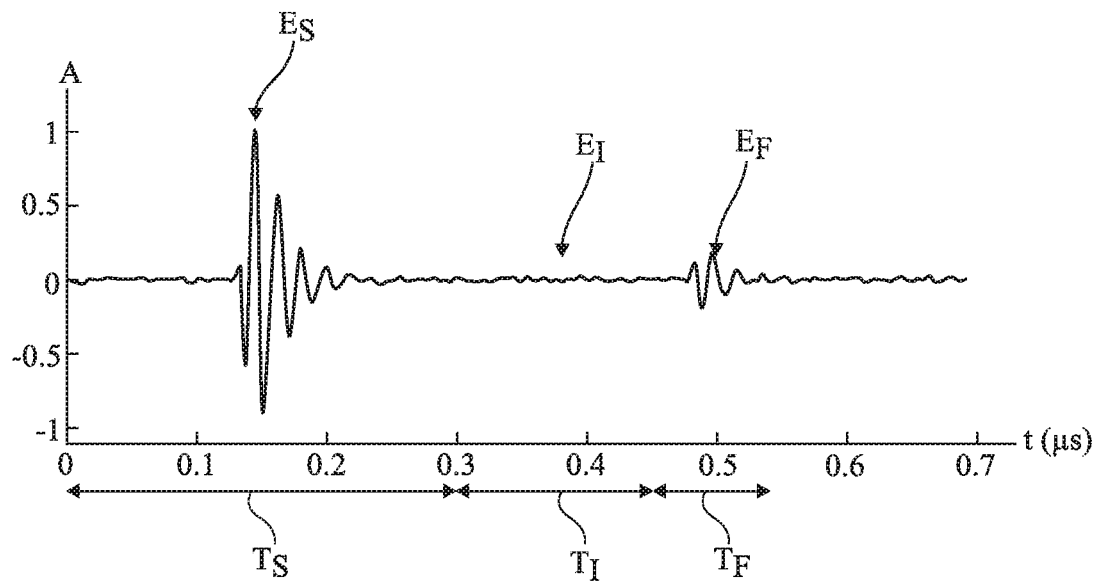
FIG. 2 is a timing diagram illustrating the operation of the device of FIG. 1.

FIGS. 1 and 2 illustrate in further detail the above-mentioned problem, which is posed when it is desired to apply the interface characterization methods described in the above-mentioned articles, to control the quality of a bonding between two substrates of same nature, in the case where the interface roughnesses between the two substrates are of very small dimensions, for example, smaller than 1 nm rms. Assemblies where the two substrates are bonded by so-called direct bonding, that is, with no addition of an adhesive polymer material at the interface between the two substrates, for example, a molecular bonding, a thermocompression bonding, a eutectic bonding, or an anodic bonding, are here particularly considered. The above-discussed problem is indeed particularly posed for this type of bonding. A direct bonding may for example be performed by application of the substrates against each other at ambient temperature and pressure. A thermal anneal may then be performed to increase the bonding energy. As a variation, the bonding may be performed in vacuum. As a variation, the bonding may be performed at high temperature and under pressure (thermocompression), with or without the application of an electric voltage.

FIG. 1 is a simplified cross-section view of an ex-ample of a device 100 for controlling the quality of a bonding between two substrates W1 and W2.

Substrate W1 has substantially planar and parallel main front and rear surfaces A1 and B1, and substrate W2 has substantially planar and parallel main front and rear surfaces A2 and B2. The rear surface of substrate W1 is bonded by direct bonding to the front surface of substrate W2. In this example, substrates W1 and W2 are of same nature, for example, made of silicon or of glass. Further, the surface roughnesses at the interface between the two substrates, that is, the roughnesses of surfaces B1 and A2 before the bonding, have very small dimensions, for example, smaller than 1 nm rms.

Device 100 comprises an ultrasound transducer 101, for example, a planar transducer, placed opposite front surface A1 of substrate W1. Device 100 further comprises a control and processing circuit 103 coupled to ultrasound transducer 101, capable of controlling the transmission of ultrasound signals by transducer 101, and of reading and analyzing ultrasound signals received by transducer 101. In the shown example, ultrasound transducer 101 is placed at a distance from front surface A1 of substrate W1, rather than in contact with the front surface of substrate W1. An advantage is that this enables not to risk deteriorating substrate W1 upon installation or removal of the transducer. In this case, an acoustic coupling liquid, for example, water or anhydrous alcohol, is preferably arranged between the transducer and the substrate assembly. As a variation, transducer 101 may be placed in contact with front side A1 of substrate W1.

An example of a method of controlling the quality of the bonding between substrates W1 and W2 by means of control device 100 of FIG. 1, based on the methods described in the above-mentioned articles, will now be described.

Control and processing circuit 103 first controls transducer 101 so that it transmits an excitation ultrasound signal towards front surface A1 of substrate W1, for example, under a normal incidence relative to front surface A1 of substrate W1.

Once the excitation signal has been transmitted, transducer 101 is controlled by control and processing circuit 103 so that it measures a return signal reflected by the assembly comprising substrates W1 and W2. The reflected return signal comprises a set of contributions, each contribution corresponding to an echo of the excitation signal generated when the excitation signal encounters a change of medium.

As shown by arrows in FIG. 1, a first echo ES of the excitation signal, or surface echo, is directly reflected towards the transducer by front surface A1 of substrate W1. A portion of the excitation signal which is not reflected by front surface A1 of substrate W1 penetrates into substrate W1, and then reflects on the interface between substrate W1 and W2. A second echo EI of the excitation signal, or interface echo, is thus reflected towards the transducer by the interface between substrates W1 and W2. Finally, a portion of the excitation signal which is not reflected by front surface A1 of substrate W1 and which is not reflected by the interface between substrates W1 and W2 penetrates into substrate W2 and reflects on rear surface B2 of substrate W2. A third echo EF of the excitation signal, or bottom echo, is then sent back towards the transducer by rear surface B2 of substrate W2.

The excitation ultrasound frequency and the duration of the excitation signal are selected, taking into account the distance between the transducer and substrate W1 and the thickness of each of substrates W1 and W2, so that the three echoes $E_S$, $E_I$, and $E_F$ can be separated in time. As an example, the excitation signal is a pulse or an ultrasound wave train having a duration in the order of 0.1 μs, and the frequency of the excitation signal is approximately 50 MHz. Thus, the duration of the excitation signal is short as compared with the time of flight in each of the layers and the time separation of the three echoes.

FIG. 2 is a timing diagram illustrating the variation over time t (in µs in abscissas) of amplitude A (in ordinates) of the return ultrasound signal measured by transducer 101 of FIG. 1, after the transmission of an excitation ultrasound signal towards front surface A1 of substrate W1.

Three successive time ranges $T_S$, $T_I$, and $T_F$ have been shown in FIG. 1, respectively corresponding to the areas of reception of echoes $E_S$, $E_I$, and $E_F$ by the transducer.

The control method based on the methods described in the above-mentioned prior art articles comprises selecting the single interface echo $E_I$, by time filtering of the return signal measured by transducer 101. In other words, control and processing circuit 103 performs a time filtering of the measured return signal to only keep the signal received during range $T_I$. A transpose, in the frequency domain, of the selected signal, is then calculated by circuit 103. As an example, circuit 103 calculates a Fourier transform of the signal measured by the transducer during range $T_I$. Based on the frequency transpose of echo signal $E_I$, circuit 103 generates a spectral signal representative of the frequency variation of the reflection coefficient of the interface between the two substrates. An analysis of the spectral signal is then performed by circuit 103 to determine information relative to the properties of the interface between substrates W1 and W2.

A problem posed by this method is that, as shown in FIG. 2, in the above considered case where substrates W1 and W2 are of same nature, are bonded by direct bonding, and have surface roughnesses of very small dimensions at the interface between the two substrates, the echo $E_I$ received by the transducer $T_I$ in window is generally too light to be able to be distinguished from the measurement noise. In other words, the reflection coefficient of the interface is close to zero, which prevents any direct use of this coefficient to evaluate the quality of the bonding. The tests performed by the inventors have in particular shown that echo $E_I$ remains practically undetectable even when the quality of the bonding is poor. As an illustrative example, the curve of FIG. 2 corresponds to a signal measured in the case of a direct silicon-to-silicon bonding (or molecular bonding) intentionally performed to have a small bonding energy, in the order of 0.05 J·m$^{-2}$, while a direct silicon-to-silicon bonding is generally considered as satisfactory when the bonding energy between the two substrates is at least 0.2 J·m$^{-2}$ and preferably at least 0.4 J·m$^{-2}$.

Thus, the methods of the above-mentioned prior art articles are not adapted to controlling bondings of the above-described type.

Figure 3:
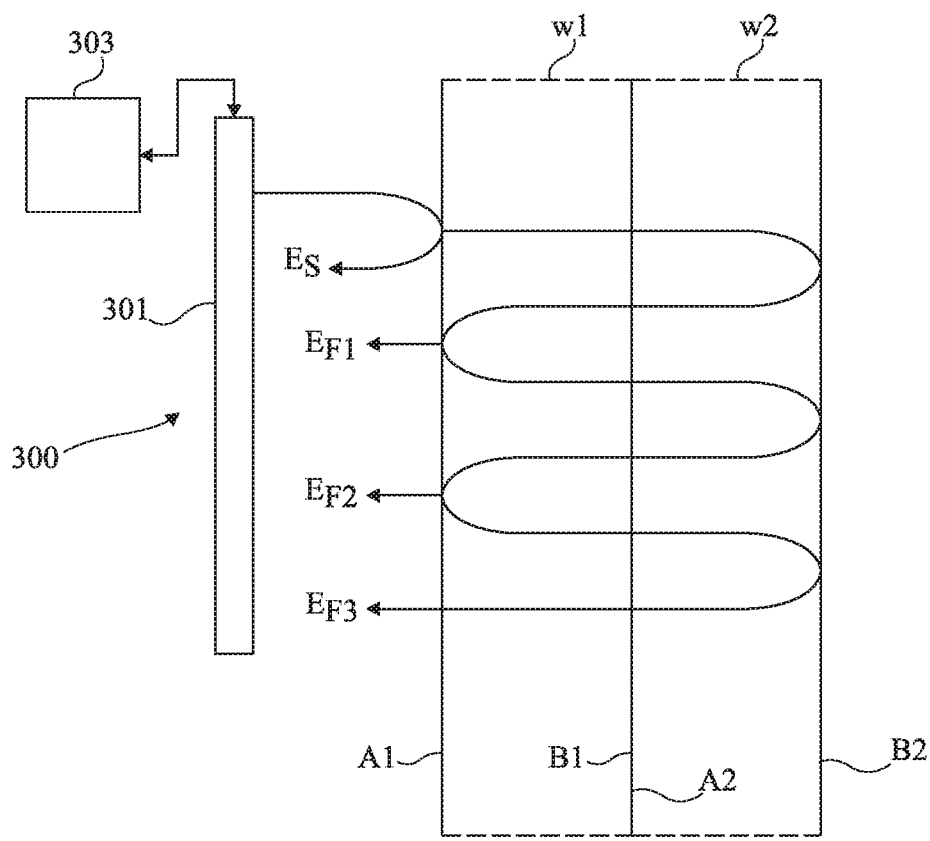
FIG. 3 is a simplified representation of an embodiment of a device for controlling the quality of a bonding between two substrates.

FIG. 3 is a simplified cross-section view of an embodiment of a device 300 for controlling the quality of a bonding between two substrates W1 and W2.

The assembly comprising substrates W1 and W2 is identical or similar to what has been described hereabove. Each of substrates W1 and W2 for example has a thickness in the range front 100 µm to 1 mm. In the shown example, substrates W1 and W2 have substantially the same thickness. As a variation, substrates W1 and W2 may have different thicknesses. The thickness of the thinner of the two substrates W1 and W2 is preferably at least equal to one tenth of the thickness of the other substrate.

Device 300 comprises an ultrasound transducer 301, for example, identical or similar to transducer 101 of FIG. 1, placed opposite from surface A1 of substrate W1. Device 300 further comprises a control and processing circuit 303 coupled to ultrasound transducer 301, capable of controlling the transmission of ultrasound signals by transducer 301, and of reading and analyzing ultrasound signals received by transducer 301. As in the example of FIG. 1, the transducer 301 of FIG. 3 is placed at a distance from front surface A1 of substrate W1 rather than in contact with the front surface of substrate W1. The described embodiments are however not limited to this specific case. The assembly comprising transducer 301 and substrates W1 and W2 may be plunged into an acoustic coupling liquid, for example, water or anhydrous alcohol. According to the type of bonding performed between substrates W1 and W2, the peripheral edges of the assembly comprising substrates W1 and W2 may be protected, for example, by a tight isolation of paraffin or of any other adapted material, to avoid a penetration of the acoustic coupling liquid between the two substrates, which might degrade or modify the bonding.

An embodiment of a method of controlling the quality of the bonding between substrates W1 and W2, by means of control device 300 of FIG. 3, will now be described.

As in the previous example, control and processing circuit 303 first controls transducer 301 so that it transmits an excitation ultrasound signal towards front surface A1 of substrate W1, for example, under a normal incidence with respect to front surface A1 of substrate W1.

Once the excitation signal has been transmitted, transducer 301 is controlled by control and processing circuit 303 to measure a return signal reflected by the assembly comprising substrates W1 and W2.

As in the example of FIGS. 1 and 2, a first echo $E_S$ of the excitation signal, or surface echo, is directly sent back towards the transducer by front surface A1 of substrate W1. A portion of the excitation signal which is not reflected by front surface A1 of substrate W1 penetrates into substrate W1.

In this example, the possible echoes sent back by the interface between substrates W1 and W2 are neglected.

The portion of the excitation signal penetrating into substrate W1 through front surface A1 thereof crosses substrate W1 and then substrate W2, and reflects for a first time on rear surface B2 of substrate W2. A second echo $E_{F1}$, or first bottom echo, is thus sent back to the transducer after reflection on rear surface B2 of substrate W2.

The bottom echo $E_{F1}$ received by transducer 301 only comprises a portion of the signal originating from the first reflection of the excitation signal on rear surface B2 of substrate W2. Indeed, a portion of the signal reflected by rear surface B2 of substrate W2 is reflected again by front surface A1 of substrate W1, and is thus not directly transmitted to transducer 301.

The signal reflected on from surface A1 of substrate W1 crosses once again the two substrates W1 and W2 and reflects again on rear surface B2 of substrate W2. A third echo $E_{F2}$, or second bottom echo, is then sent back towards the transducer by rear surface B2 of substrate W2.

Here again, the bottom echo $E_{F2}$ received by transducer 301 only comprises a portion of the signal originating from the second reflection of the excitation signal on rear surface B2 of substrate W2. Indeed, a portion of the signal reflected by rear surface B2 of substrate W2 reflects again on front surface A1 of substrate W1, and is thus not directly transmitted to transducer 301.

The signal reflected on front surface A1 of substrate W1 crosses once again the two substrates W1 and W2 and reflects again on rear surface B2 of substrate W2. A fourth echo $E_{F3}$, or third bottom echo, is thus reflected towards the transducer by rear surface B2 of substrate W2, and so on until the excitation signal has totally vanished.

The excitation ultrasound frequency and the duration of the excitation signal are preferably selected, taking into account the distance between the transducer and substrate W1 and the thickness of each of substrates W1 and W2, so that surface echo $E_S$ on the one hand, and bottom echoes $E_{F1}$, $E_{F2}$, $E_{F3}$, etc. on the other hand, can be separated in time. It should be noted that, as will more clearly appear from the rest of the description, an advantage of the provided method is that bottom echoes $E_{F1}$, $E_{F2}$, $E_{F3}$, etc. do not have to be separable from one another in time.

As an example, the excitation signal is a pulse or an ultrasound wave train having a duration shorter than 1 µs, and preferably shorter than 0.5 µs, and the frequency of the excitation signal is in the range from 1 MHz to 10 GHz, and preferably from 100 MHz to 1 GHz.

Figure 4:
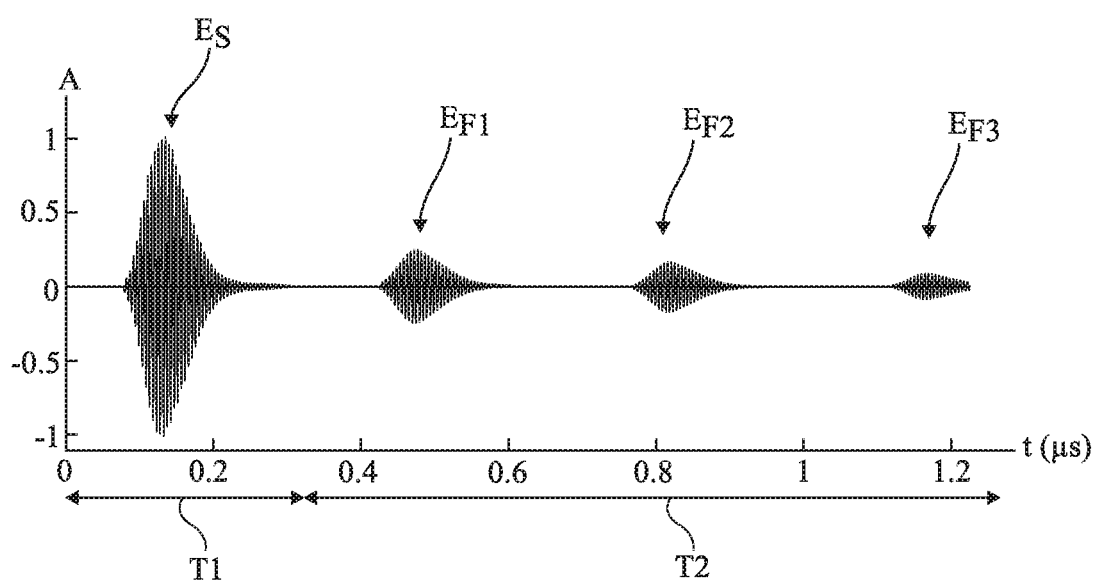
FIG. 4 is a timing diagram illustrating the operation of the device of FIG. 3.

FIG. 4 is a timing diagram illustrating the variation over time t (in µs in abscissas) of amplitude A (in ordinates) of the return ultrasound signal measured by transducer 301 in the system of FIG. 3, after the transmission of an excitation ultrasound signal towards front surface A1 of substrate W1. In the example of FIG. 4, the duration of the excitation signal is approximately 0.1 µs, and the frequency of the excitation signal is in the order of 200 MHz.

Two consecutive time ranges T1 and T2 have been shown in FIG. 4. Range T1 only comprises the surface echo $E_S$ directly returned by front surface A1 of the assembly, and range T2 comprises subsequent echoes returned by the assembly and, in particular, the three successive bottom echoes $E_{F1}$, $E_{F2}$ and $F_{F3}$.

In a first variation, the control method implemented by device 300 comprises the selection, by control and processing circuit 303, by time filtering of the return signal measured by transducer 301, of the return signal received during time range T2 only. The method may further comprise the selection, by control and processing circuit 303, by time filtering of the return signal measured by transducer 301, of the return signal received during time range T1 only.

A transpose, in the frequency domain, of the signal measured by the transducer during range T2, is then calculated by circuit 303. As an example, circuit 303 calculates a Fourier transform of the signal measured during range T2.

Based on the frequency transpose of the signal measured during range T2, circuit 303 generates a spectral signal $R_g$ representative of the frequency variation of a general reflection coefficient of the structure, defined as being the ratio of the return signal measured by the transducer to the excitation signal transmitted by the transducer.

As an example, the surface echo signal $E_S$ measured by the transducer during phase T1 is considered as being substantially identical to the excitation signal initially transmitted by the transducer, and the general reflection coefficient $R_g$ is defined as follows:

$R_g$=FFT(T2)/FFT(T1)

where FFT(T2) and FFT(T1) respectively designate the transpose in the frequency domain of the return signal measured by the transducer during phase T2, and the transpose in the frequency domain of the return signal measured by the transducer during phase T1.

In a second preferred variation, the control method implemented by device 300 comprises the selection, by control and processing circuit 303, by time filtering of the return signal measured by transducer 301, of the return signal received all along time ranges T1 and T2, which period is called range T1+T2. The method may further comprise the selection, by control and processing circuit 303, by time filtering of the return signal measured by transducer 301, of the return signal received during time range T1 only.

A transpose, in the frequency domain, of the signal measured by the transducer during range T1+T2, is then calculated by circuit 303. As an example, circuit 303 calculates a Fourier transform of the signal measured during range T1+T2.

Based on the frequency transpose of the signal measured during range T1+T2, circuit 303 generates a spectral signal Rg representative of the frequency variation of a general reflection coefficient of the structure, defined as being the ratio of the return signal measured by the transducer to the excitation signal transmitted by the transducer.

As an example, the surface echo signal $E_S$ measured by the transducer during phase T1 is considered as being substantially identical to the excitation signal initially transmitted by the transducer, and the general reflection coefficient $R_g$ is defined as follows:

$R_g$=FFT(T1+T2)/FFT(T1)

where FFT(T1+T2) and FFT(T1) respectively designate the transpose in the frequency domain of the return signal measured by the transducer during phase T1+T2, and the transpose in the frequency domain of the return signal measured by the transducer during phase T1.

It should be noted that in the first and second above-described variations, term FFT(T1) of the definition of coefficient $R_g$ may be replaced with any other frequency representation of the excitation signal transmitted by the transducer, for example, a frequency transpose of a reference signal directly sampled from the transducer during the phase of transmission of the excitation signal by the transducer. In this case, the provided control method may advantageously be implemented, in its second variation, even when surface echo $E_S$ cannot be separated in time from bottom echoes $E_{F1}$, $E_{F2}$, $E_{F3}$, etc.

Figure 5:
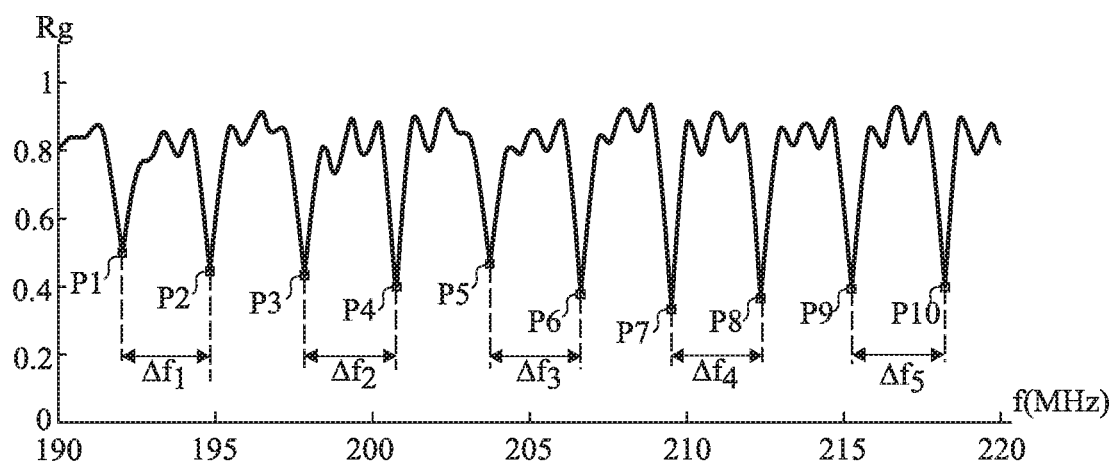
FIG. 5 is a spectrogram illustrating the operation of the device of FIG. 3.

FIG. 5 is a spectrogram showing the variation according to frequency f (in abscissas in MHz) of the general reflection coefficient $R_g$ (in ordinates) such as defined hereabove, calculated by processing circuit 303 based on the return signal measured by transducer 301.

As shown in FIG. 5, general reflection coefficient $R_g$ exhibits a succession of local minimum values or resonance peaks P1, P2, P3, P4, P5, P6, P7, P8, P9, P10, regularly distributed across the measurement frequency range (from 190 to 220 MHz in the shown example and corresponding to the reception bandwidth of ultrasound transducer 301).

Studies carried out by the inventors have shown that the resonance peaks correspond to Lamb-mode resonances of the assembly formed by substrates W1 and W2. More particularly, one peak out of two in the series of peaks (the peaks of even rank in the present example) corresponds to a symmetric Lamb mode resonance (that is, corresponding to a vibration mode symmetric with respect to the interface plane between substrates W1 and W2), the other peaks (the peaks of odd rank in this example) corresponding to antisymmetric Lamb mode resonances (that is, corresponding to vibration modes antisymmetric with respect to the interface plane between substrates W1 and W2).

The inventors have observed that the frequency position of the symmetric resonance peaks (the peaks of even ranks in the present example) varies significantly according to the quality of the bonding between substrates W1 and W2, and more particularly according to the bonding energy between substrates W1 and W2. The position of the antisymmetric resonance peaks (the peaks of odd ranks in this example) is however independent from the quality of the bonding between the substrates.

The inventors explain this behavior by the fact that symmetric Lamb-mode resonances do not induce a significant displacement of the middle of the assembly between the two substrates, but generate, in the middle of the assembly (at the interface between the two substrates in the shown example), contraction/expansion stress according to a direction orthogonal to the plane of the interface. The interface is thus relatively strongly stressed by symmetric Lamb-mode resonances, whereby the quality of the bonding has an influence on the frequency of the symmetric Lamb-mode resonances. Conversely, antisymmetric Lamb-mode resonances cause a displacement of the entire structure, but generate no significant compression/expansion stress at the interface. The quality of the bonding thus has no or little influence on the frequency of antisymmetric Lamb mode resonances.

Thus, the frequency interval between two consecutive peaks of signal $R_g$ is representative of the quality of the bonding between substrates W1 and W2.

The control method implemented by device 300 comprises the detection, by processing circuit 303, of at least two consecutive local minimum values of signal $R_g$, corresponding to two consecutive symmetric and antisymmetric or antisymmetric and symmetric resonances of signal $R_g$, for example, Lamb-mode resonances, and the measurement of the frequency interval between the two peaks.

The inventors have more particularly observed that the frequency of the symmetric resonance peaks (the peaks of even rank in the shown example) decreases when the quality of the bonding degrades. Thus, the frequency interval $\Delta f$ between an antisymmetric resonance peak and the symmetric resonance peak of immediately higher rank is all the smaller as the quality of the bonding is low, and conversely. The estimation of the quality of the interface between substrates W1 and W2 can thus be based on the measured of the frequency interval between the antisymmetric resonance peaks and the symmetric resonance peaks.

Theoretically, the frequency interval between each antisymmetric resonance peak and the symmetric resonance peak of immediately higher rank is substantially constant over the entire measured frequency range. A single measurement of the frequency interval $\Delta f$ between an antisymmetric resonance and the symmetric resonance peak of immediately higher rank thus enables to obtain information as to the quality of the bonding between the substrates.

However, in a preferred embodiment, to increase the signal-to-noise ratio of the measurement and improve the accuracy of the control, it is provided to measure, for each of the antisymmetric resonance peaks (the peaks of odd rank in this example) of the measurement frequency range, the frequency interval between the antisymmetric resonance peak and the symmetric resonance peak of immediately higher rank, and then to calculate the average of the measured frequency intervals. In the example of FIG. 5, five frequency intervals $\Delta f_1$, $\Delta f_2$, $\Delta f_3$, $\Delta f_4$, $\Delta f_5$ are measured from the positions of the ten peaks P1, P2, P3, P4, P5, P6, P7, P8, P9, P10 of the signal, with $\Delta f_1 = f(P2) - f(P1)$, $\Delta f_2 = f(P4) - f(P3)$, $\Delta f_3 = f(P6) - f(P5)$, $\Delta f_4 = f(P8) - f(P7)$, and $\Delta f_5 = f(P10) - f(P9)$. The frequency interval $\Delta f$ used to evaluate the quality of the interface between substrates W1 and W2 corresponds to the average of values $\Delta f_1$, $\Delta f_2$, $\Delta f_3$, $\Delta f_4$, $\Delta f_5$.

Of course, the described embodiments are not limited to the shown example where the measurement frequency range of signal $R_g$ includes ten resonance peaks. The described embodiments more generally apply whatever the extent of the measurement frequency range of signal $R_g$, provided that it comprises at least two and preferably at least four peaks corresponding to resonances, for example, in Lamb modes, of the assembly formed by substrates W1 and W2.

The detection of the resonance peaks by control and processing circuit 303 may be implemented by any known local minimum value detection method. Such methods are within the abilities of those skilled in the art and will not be detailed herein. The detection of resonance peaks may in particular comprise a thresholding to filter possible parasitic peaks.

In practice, to determine whether the antisymmetric resonance peaks are the peaks of odd rank or the peaks of even rank, three consecutive peaks Pi, Pi+1, Pi+2 in the series of detected peaks may be considered, for example the first three peaks in the series, and the frequency intervals between peaks Pi and Pi+1 on the one hand, and between peaks Pi+1 and Pi+2 on the other hand, may be calculated. If the interval between peaks Pi and Pi+1 is smaller than the interval between peaks Pi+1 and Pi+2, this means that peaks Pi, Pi+2, etc. are antisymmetric resonance peaks and that peaks Pi+1, Pi+3, etc. are symmetric resonance peaks. In the opposite case, peaks Pi, Pi+2, etc., are symmetric resonance peaks and peaks Pi+1, Pi+3, etc., are antisymmetric resonance peaks.

Figure 6:
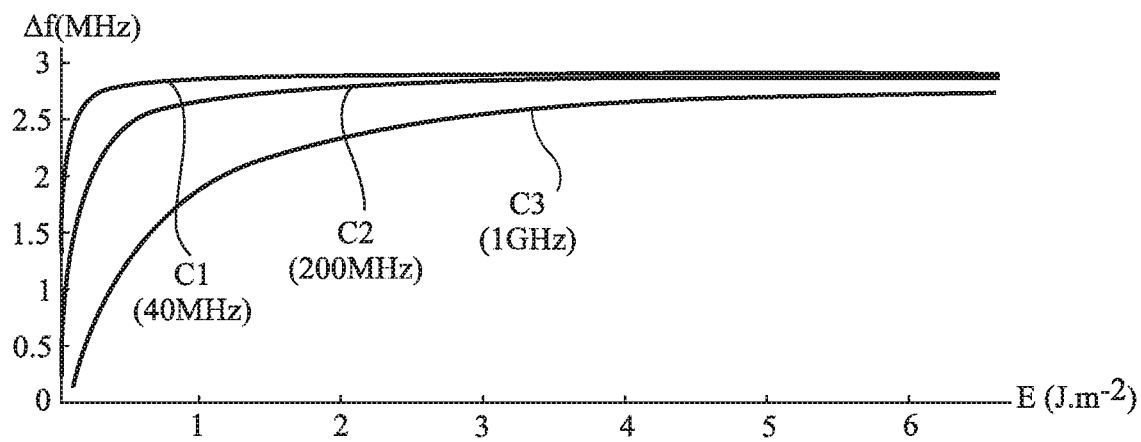
FIG. 6 is a diagram illustrating the operation of the device of FIG. 3.

FIG. 6 is a diagram showing the variation observed by the inventors of the frequency interval $\Delta f$ (in MHz, in ordinates) measured between the antisymmetric and symmetric resonance peaks of spectral signal $R_g(f)$, according to the bonding energy E (in $J \cdot m^{-2}$, in abscissas) between the two substrates.

FIG. 6 more particularly comprises a curve C2 corresponding to the above-considered case of an ultrasound excitation performed at a frequency in the order of 200 MHz. FIG. 6 further comprises a curve C1 corresponding to an ultrasound excitation at a frequency in the order of 40 MHz and a current C3 corresponding to an ultrasound excitation at a frequency in the order of 1 GHz.

As appears in FIG. 6, curves C1, C2, and C3 are monotonic increasing curves, that is, the higher the bonding energy E between the two substrates, the larger the frequency interval $\Delta f$ measured between an antisymmetric resonance peak and the symmetric resonance peak of immediately higher rank of spectral signal $R_g$, and conversely.

For a given ultrasound excitation frequency, the variation law h such that $E = h(\Delta F)$ may be determined during a phase of prior calibration (not detailed) of the control device. During such a calibration phase, it may for example be provided to measure value $\Delta f$ for a series of reference assemblies having different known bonding energies. Law h may then be stored by control and processing circuit 303, for example, in the form of a lookup table or in the form of an analytical law.

The control method implemented by device 300 may comprise a step of determination, by processing circuit 303, based on the value $\Delta f$ measured on signal $R_g$ and by applying law h, of a value representative of the bonding energy between the two substrates W1 and W2.

As shown in FIG. 6, curves C1, C2, C3 all converge towards a same plateau value when the bonding energy between the substrates increases. This plateau is however reached all the later as the frequency of the excitation ultrasound signal is high. Thus, the sensitivity range of the described control method is all the wider as the excitation ultrasound frequency is high. An excitation frequency in the range from 100 MHz to 1 GHz is an advantageous compromise for most microelectronics or optoelectronics applications.

Although an embodiment where the evaluation of the quality of the bonding is based on a measurement of the frequency interval $\Delta f$ between each antisymmetric resonant peak (of odd rank in the shown example) and the symmetric resonance peak (of even rank in this example) of immediately higher rank of spectral signal $R_g$ has been described, a similar method based on a measurement of a frequency interval $\Delta f$ between each symmetric resonance peak (of even rank in this example) and the antisymmetric resonance peak (of odd rank in this example) of immediately higher rank of spectral signal $R_g$ may be implemented. In this case, interval $\Delta f$ increases when the quality of the bonding degrades, and conversely. Law h such that $E=h(\Delta f)$ will be accordingly adapted.

In the example described hereabove in relation with FIGS. 3, 4, 5, and 6, the return signal measured by the transducer during time range T2, taken into account to calculate the general reflection coefficient $R_g$ of the assembly, comprises three successive bottom echoes $E_{F1}$, $E_{F2}$, $E_{F3}$, returned by the rear surface of the assembly. The described embodiments are however not limited to this specific case. More generally, the described embodiment may be implemented as soon as the time range T2 considered for the calculation of reflection coefficient $R_g$ includes at least one bottom echo of the assembly, that is, an echo sent back by the rear surface B2 of substrate W2.

Figure 7:
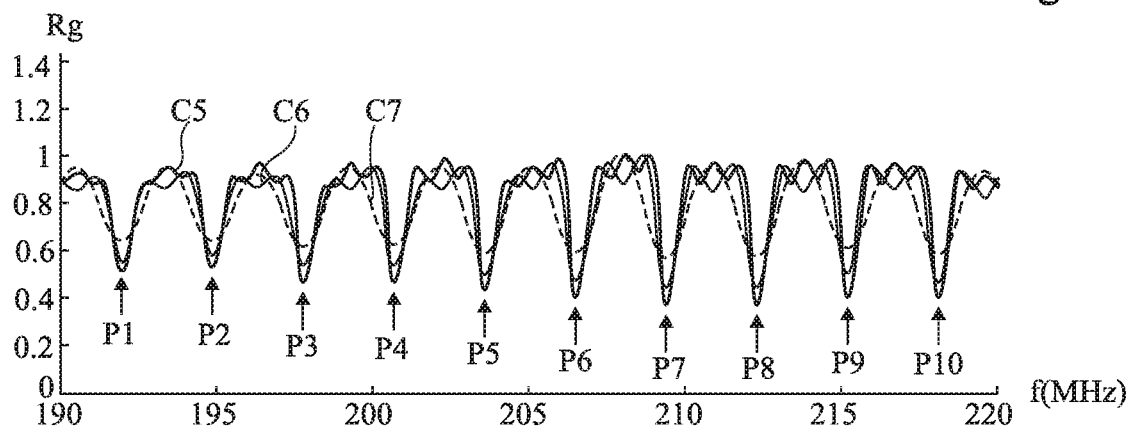
FIG. 7 is a spectrogram similar to that of FIG. 5, illustrating in further detail the behavior of the device of FIG. 3.

FIG. 7 is a spectrogram similar to that of FIG. 5, illustrating the variation of the response of the device of FIG. 3 according to the number of successive bottom echoes considered for the calculation of general reflection coefficient $R_g$. FIG. 7 comprises a curve C5 identical or similar to the curve shown in FIG. 5, corresponding to the signal $R_g$ obtained when the time range T2 considered for the calculation of signal $R_g$ comprises the three successive bottom echoes $E_{F1}$, $F_{F2}$, $F_{F3}$ reflected by the rear surface of the assembly. FIG. 7 further comprises a curve C6 representing the signal $R_g$ obtained when the considered time range T2 comprises bottom echoes $E_{F1}$, $E_{F2}$ but does not comprise echo $E_{F3}$. FIG. 7 further comprises a curve C7 representing the signal $R_g$ obtained when the considered time range T2 comprises bottom echo $E_{F1}$, but does not comprise bottom echoes $E_{F2}$ and $E_{F3}$.

As illustrated in FIG. 7, the frequency position of the peaks is independent from the number of bottom echoes considered for the calculation of the general reflection coefficient. However, the peaks are all the more marked, and thus detectable with all the more accuracy, as the considered number of bottom echoes is high. Thus, in a preferred embodiment, the time range T2 considered for the calculation of the general reflection coefficient comprises at least the first two bottom echoes of the excitation signal, reflected by the rear surface of the assembly, and preferably the first three bottom echoes of the excitation signal. In practice, beyond the third bottom echo, the accuracy gain provided by the taking into account of the next bottom echoes is relatively small since the next bottom echoes are strongly attenuated. Thus, in a preferred embodiment, range T2 comprises no more than the first three bottom echoes of the excitation signal.

Figure 8:
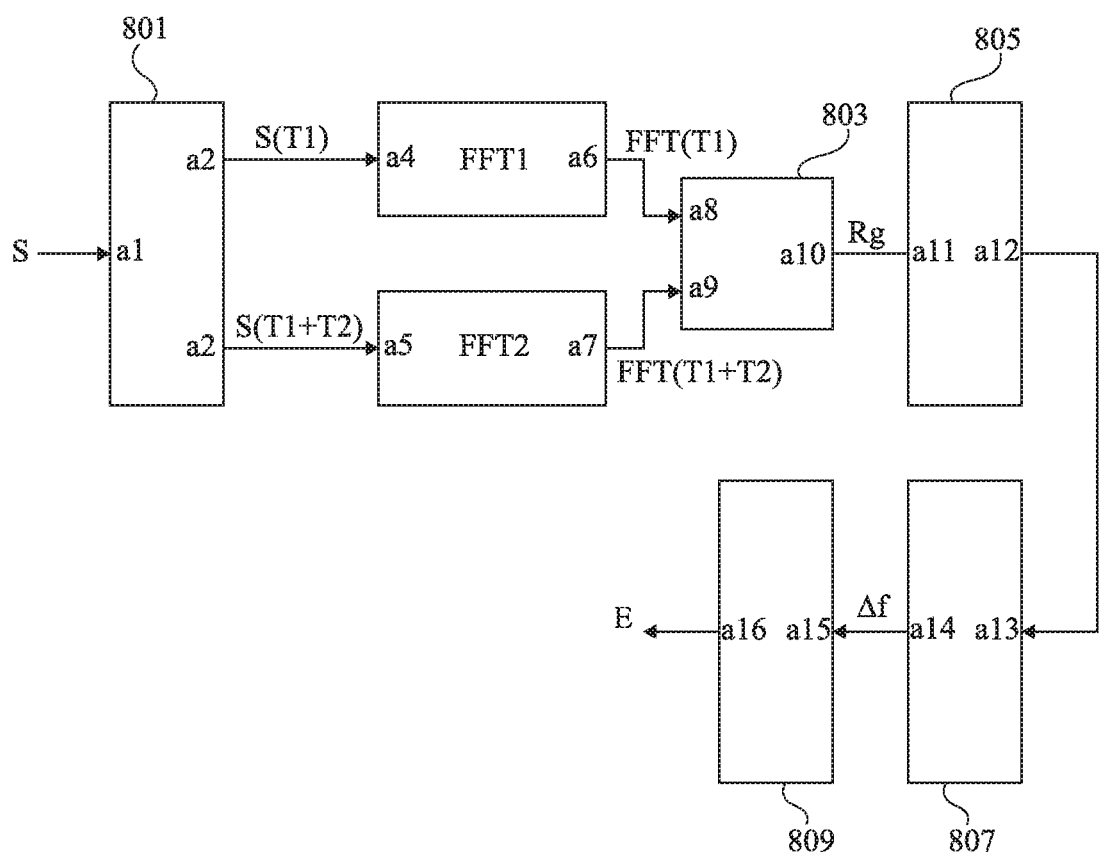
FIG. 8 is a block diagram of an example of a processing circuit of the device of FIG. 3.

FIG. 8 is a block diagram of an example of implementation of the processing circuit 303 of the control device 300 of FIG. 3.

In this example, circuit 303 comprises a time filtering stage 801. Stage 801 comprises an input a1 entirely receiving the return signal S measured by ultrasound transducer 301, particularly during ranges T1 and T2, after the transmission of an excitation signal by the transducer, and two outputs a2 and a3 respectively supplying the return signal S(T1) measured by the transducer during time range T1, and the return signal S(T1+T2) measured by the transducer during time range T1+T2.

Circuit 303 of FIG. 8 further comprises two frequency transpose calculation stages FFT1 and FFT2. Stage FFT1 has an input a4 coupled to output a2 of stage 801, and stage FFT2 has an input a5 coupled to output a3 of stage 801. Each of stages FFT1 and FFT2 is capable of calculating a transpose in the frequency domain, for example, a fast Fourier transform, of the time signal applied to its input. Stage FFT1 comprises an output a6 supplying transpose FFT(T1) of signal S(T1), and an output a7 supplying transpose FFT(T1+T2) of signal S(T1+T2).

Circuit 303 of FIG. 8 further comprises a stage 803 comprising two inputs a8 and a9 respectively coupled to output a6 of state FFT1 and to output a7 of stage FFT2. Stage 803 is capable of generating spectral signal $R_g$ representative of the frequency variation of the general reflection coefficient of the assembly. To generate signal $R_g$, stage 803 may for example divide the output signal FFT(T1+T2) of stage FFT2 by the output signal FFT(T1) of stage FFT1. Stage 803 comprises an output a10 for supplying signal $R_g$.

Circuit 303 of FIG. 8 further comprises a resonance peak detection stage 805 having an input a11 is coupled to output a10 of stage 803. Stage 805 is capable of analyzing the signal $R_g$ supplied by stage 803 and of detecting the resonance peaks characteristic of this signal (peaks P1, P2, P3, P4, P5, P6, P7, P8, P9, P10 in the example of FIG. 5). Stage 805 comprises an output a12 supplying the frequency coordinates of the detected peaks.

Circuit 303 of FIG. 8 further comprises a stage 807 capable of measuring the frequency interval $\Delta f$ between consecutive resonance peaks detected by stage 805. Stage 807 comprises an input a13 coupled to output a12 of stage 805, and an output a14 supplying the measured value $\Delta f$, possibly averaged.

Circuit 303 of FIG. 8 further comprises a stage 809 capable of determining a value E representative of the bonding energy between the two controlled substrates of the assembly based on the frequency interval value $\Delta f$ supplied by stage 807. Stage 809 comprises an input a15 coupled to output a14 of stage 807, and an output a16 supplying value E.

An advantage of the embodiments described in relation with FIGS. 3 to 8 is that they enable to perform a non-destructive control of the quality of a bonding between two substrates, and this including in the case where the two substrates are of same nature and have surface roughnesses of very small dimensions at the interface between the two substrates.

The described embodiments may however also be used to control assemblies where the two substrates are made of different materials, and/or exhibit greater roughnesses at the interface between the two substrates. Indeed, the above-described method remains applicable in the case where the return signal measured by the transducer in range T2 comprises, in addition to the bottom echoes shown in FIG. 3, one or a plurality of interface echoes.

Further, an example of a method of controlling the quality of the bonding between two substrates has been described hereabove, the method comprising a single phase of transmission of an ultrasound excitation signal by the transducer of the control device, followed by a phase of reception of a return ultrasound signal by the transducer, and then by a phase of analysis of the return signal. As a variation, the above-mentioned transmit-receive phases my be repeated a plurality of times, for example, from 200 to 600 times at a firing frequency (number of transmissions per second of the excitation signal) in the order of 1 kHz, to increase the signal-to-noise ratio of the measurement. In this case, the signal analyzed by the processing device is for example an average of the return signals measured by the transducer during successive transmit-receive phases.

Further, the above-described control method may be re-peated a plurality of times, by displacing the ultrasound transducer parallel to the mean plane of the assembly of the substrates between two successive iterations, to obtain an image or a mapping of the local bonding energy between the two substrates. The resolution of this image will particularly depend on the surface of the assembly portion excited by the ultrasound transducer at each iteration of the method and on the displacement of the transducer relative to the assembly between two successive iterations of the method.

Specific embodiments have been described. Various alterations, modifications, and improvements will occur to those skilled in the art. In particular, the described embodiments are not limited to the various numerical values mentioned as an illustrative example in the present description.

What is claimed is:

1. A method of evaluating quality of a bonding of an assembly comprising first and second substrates each having a front surface and a rear surface, the rear surface of the first substrate being bonded to the front surface of the second substrate, the method comprising the steps of:
    a) transmitting an excitation ultrasound signal towards the assembly by means of an ultrasound transducer placed on the front surface side of the first substrate;
    b) measuring, by means of said transducer, an ultrasound signal comprising at least one echo (EF1) of the excitation signal on the rear surface of the second substrate;
    c) calculating, by means of a processing circuit, a general reflection coefficient defined as a ratio of a first signal representative of a frequency domain transpose of the ultrasound signal measured at step b), up to a second signal representative of a frequency domain transpose of the excitation signal; and
    d) deducing from said spectral signal, by means of the processing circuit, information relative to the quality of the bonding between the first and second substrates.

2. The method of claim 1, wherein step d) comprises the steps of:
    detecting a series of successive peaks of the general reflection coefficient, corresponding to resonances of the assembly comprising the first and second substrates; and
    determining the average frequency interval Δf between two consecutive peaks of respectively odd and even ranks or of respectively even and odd ranks in the series.

3. The method of claim 2, wherein step d) comprises determining, from the determined average frequency interval Δf, a value representative of the bonding energy between the first and second substrates.

4. The method of claim 2, wherein said series of peaks comprises at least 4 peaks.

5. The method of claim 1, wherein said return signal comprises at least two successive echoes of the excitation signal on the rear surface of the second substrate.

6. The method of claim 5, wherein said return signal comprises three successive echoes of the excitation signal on the rear surface of the second substrate.

7. The method of claim 1, wherein:
    at step b), said return signal is measured during two consecutive time ranges T1 and T2, range T1 only comprising a surface echo of the excitation signal directly reflected by the front surface of the first substrate, and range T2 comprising said at least one echo of the excitation signal on the rear surface of the second substrate; and
    at step c), the calculated general reflection coefficient corresponds to the ratio of a frequency transpose of the return signal measured during range T1+T2 to a frequency transpose of the return signal measured during range T1.

8. The method of claim 1, wherein the excitation ultrasound signal has a frequency in the range from 100 MHz to 1 GHz.

9. The method of claim 1, wherein the duration of the excitation ultrasound signal is shorter than 1 μs.

10. The method of claim 1, wherein steps a) to d) are repeated a plurality of times by displacing the ultrasound transducer parallel to the mean plane of the assembly between two successive iterations, to obtain an image or mapping of the quality of the bonding between the two substrates.

11. The method of claim 1, wherein, at step a), the excitation ultrasound signal is transmitted under a normal incidence with respect to the front surface of the first substrate.

12. A device for evaluating quality of a bonding of an assembly comprising first and second substrates each having a front surface and a rear surface, the rear surface of the first substrate being bonded to the front surface of the second substrate, the device comprising an ultrasound transducer and a processing device configured to implement the method of claim 1.

* * * * *